United States Patent [19]

Sumi et al.

[11] Patent Number: 4,776,671
[45] Date of Patent: Oct. 11, 1988

[54] HIGH PROPERTY, HIGH PRECISION COLOR FILTER AND METHOD FOR MANUFACTURING THE SAME

[75] Inventors: Takao Sumi, Kyoto; Tenri Hiratani, Otsu; Yoshihide Inako, Nishinomiya; Masahiro Nishida, Ibaraki, all of Japan

[73] Assignee: Nissha Printing Co., Ltd., Kyoto, Japan

[21] Appl. No.: 86,128

[22] PCT Filed: Nov. 28, 1986

[86] PCT No.: PCT/JP86/00608

§ 371 Date: Jul. 17, 1987

§ 102(e) Date: Jul. 17, 1987

[30] Foreign Application Priority Data

Nov. 28, 1985 [JP] Japan .................. 60-268879
Nov. 28, 1985 [JP] Japan .................. 60-268880

[51] Int. Cl.⁴ .................. G02B 5/20; G02F 1/133; H01M 14/00
[52] U.S. Cl. .................. 350/311; 350/339 F; 430/7
[58] Field of Search .............. 350/311, 339 F; 430/7, 430/24; 8/467, 471, 478, 468

[56] References Cited

U.S. PATENT DOCUMENTS

| | | | |
|---|---|---|---|
| 4,012,250 | 3/1977 | Goffe .................. | 8/467 |
| 4,081,277 | 3/1978 | Brault et al. .................. | 430/7 |
| 4,196,009 | 4/1980 | Martin et al. .................. | 350/311 |
| 4,196,010 | 4/1980 | Sandhu .................. | 350/311 |
| 4,239,842 | 12/1980 | Sandhu .................. | 350/311 |
| 4,383,018 | 5/1983 | Martin et al. .................. | 350/311 |
| 4,388,387 | 6/1983 | Tsuboi .................. | 430/7 |
| 4,600,833 | 7/1986 | Shibata et al. .................. | 350/311 |

FOREIGN PATENT DOCUMENTS

| | | | |
|---|---|---|---|
| 3045 | 1/1975 | Japan . | |
| 110379 | 9/1978 | Japan . | |
| 166607 | 12/1980 | Japan . | |
| 59-86011 | 5/1984 | Japan .................. | 350/311 |
| 254001 | 12/1985 | Japan . | |
| 61-51102 | 3/1986 | Japan .................. | 350/311 |

Primary Examiner—Bruce Y. Arnold
Assistant Examiner—Terry S. Callaghan
Attorney, Agent, or Firm—Wenderoth, Lind & Ponack

[57] ABSTRACT

The high-property, high-precision color filter has an active film layer formed on a transparent substrate and comprised of at least one or more of active alumina or active silica, and fine patterns in the form of dot, stripe, and/or other patterns formed on the active film layer by a dye of any desired color being taken up into fine holes in the active film layer, and further an overcoat layer placed on the active film layer and having no affinity to the dye.

In the method for manufacture of the color filter, the step of forming the fine patterns comprises mounting a metal mask having specified patterns holes on the active film layer, mounting a transfer sheet having an ink layer containing a dye on top of the active film layer, and subsequent heating in an atmosphere of reduced pressure.

According to the invention, it is possible to obtain a color filter having excellent properties, including smoothness, heat resistance, water resistance, and light-resistance, and fine patterns in three colors, red green, and blue, having excellent spectral properties, and which can be manufactured by a simple process.

15 Claims, 1 Drawing Sheet

HIGH PROPERTY, HIGH PRECISION COLOR FILTER AND METHOD FOR MANUFACTURING THE SAME

TECHNICAL FIELD

The present invention relates to a color filter for use in various types of display devices and a method for manufacturing the same. More particularly, the invention relates to a high property, high precision color filter for use in liquid crystal display devices and the like having color display capability and a method for manufacturing the same.

BACKGROUND ART

Various kinds of color filters for display devices have been known in the art, but as typical examples there of, color filters for liquid crystal display devices are taken up for discussion herein.

Liquid crystal display devices are widely used for digital display in electronic calculators and clocks and for analog display in measuring devices, instrumentation, household appliances, and audio equipment. Recently, needs have been increasing for incorporation of color display capability into such display devices, particularly in such applications as peripheral terminal displays in various kinds of equipment, mounted display, telephone display, and TV image display. In attempts to meet said needs, various liquid crystal color display devices have been proposed, some of .hiwch are now being put in practical application. However, none of the color display systems for liquid crystal display devices so far proposed have been successful in meeting the user's needs.

One known type of color filter applicable to liquid crystal display devices having color display capability is such that a transparent substrate has gelatin layers formed in the interior thereof, the gelatin layers being colored by the photolithography technique in different colors, one layer after another.

Any color filter produced by such technique, however, involves the following difficulties. That is, (a) it lacks evenness: since gelatin layers in different colors are laid one over another, level unevenness is likely to be produced; (b) it lacks heat resistance and, therefore, a crack is likely to be caused in the color filter by heating when a transparent conductive film is formed by deposition on the filter. If the deposition step is carried out at a low temperature in order to avoid aforesaid difficulty of cracking, the transparent conductive film is likely to show an increased resistance or allow less transmission of light. And (c) such color filter lacks water resistance, whereby washing the filter with an aqueous solution becomes difficult, it being thus likely that the display performance quality of the liquid crystal is deteriorated by stains. Further, (d) the color filter lacks resistance to weathering, and (e) the manufacturing process for it is complicated. For these reasons, color filters produced by the photolithography method have not satisfactorily met user's needs.

Another construction of a color filter of the type is known which incorporates aluminum oxide layers. For example, one such color filter comprises aluminum oxide anode layers formed in the interior of a transparent substrate, the anode layers being colored (Japanese Published Unexamined Patent Application Nos. 53-99822 and 53-110379), and another comprises porous layers formed by deposition on the interior of a transparent substrate, the porous layers each having a coloring material deposited thereon (Japanese Published Unexamined Patent Application No. 55-166607).

However, these color filters have critical drawbacks in that (a) they have no transparency and that (b) they have poor dye affinity. Therefore, neither of them has been put into practical application.

In view of these facts, the present inventors made extensive studies in an attempt to overcome the difficulties with color filters produced by aforesaid photolithography technique and to provide a color filter which could be put to practical use. As a result, they developed, as their previous invention, a color filter comprising active film layers formed of a colloidal alumina and a colloidal silica, the film layers being dyed (see Japanese Patent Application No. 59-97210, laid open to public inspection on Dec. 14, 1986 under Japanese Published Unexamined Patent Application No. 60-254001). This color filter is produced by repeating, according to the number of colors required, a process which comprises the step of forming on a transparent substrate an active film layer comprised of at least one or more of active alumina or active silica and then mounting on the active layer a metal mask having specified pattern holes, the step of mounting on the metal mask a transfer sheet having an ink layer containing a capable of sublimation dye and/or a hot-melt dye capable of being vaporized, the step of heating under normal pressure to cause the dye in the ink layer to migrate in vapor state to the active film layer so that the film layer is dyed, and the step of removing the transfer sheet and the metal mask, thereby sequentially forming the active film layer patterns corresponding to the pattern holes in the metal mask, finally forming an overcoat layer for closing from above the fine holes in the active film layer.

The color filter produced by this method eliminates aforesaid various drawbacks of the conventional color filters, but involves another set of problems as stated below. That is, since a metal mask is interposed between the transparent substrate and the transfer sheet, it is necessary that the dye be vaporized so as to be allowed to jump a distance corresponding to the thickness of the metal mask, instead of the method of contact migration as in conventional transfer printing. Therefore, the dye requires sufficient considerable energy (heat and time) to overcome the air resistance involved. Accordingly, a considerable amount of deformation due to the expansion of the metal mask is likely to develop, the performance accuracy of the color filter being thereby adversely affected. Another problem is that since the dye used must be readily vaporizable, the range of dye selection is limited, which fact renders it impracticable to use dyes having excellent dyeing power and good heat stability, naturally leading to lowered performance characteristics of the color filter.

One conceivable approach toward solving these problems might be to use a metal mask having less film thickness. However, it was found that this would involve breakage of the metal mask due to its deficiency in strength and would be undesirable from the standpoint of durability.

Then, after their further research into the possibilities of solving aforesaid problems with the prior-art methods, and by improving the foregoing method, which may be called the metal mask method, the present inventors have now arrived at the present invention, overcoming the difficulties with the prior art.

The object of the present invention is to provide a color filter having excellent properties, such as smoothness, heat resistance, water resistance, and light-resistance, and fine patterns with excellent spectral properties for three colors, red (R), green (G), and blue (B), and capable of being manufactured in an easy process, and a method for manufacturing the same.

SUMMARY OF THE INVENTION

Aforesaid object is accomplished in accordance with the various features of the invention as stated below. The method of manufacturing a high-property, high-precision color filter according to the invention comprises the step of forming on a transparent substrate an active film layer comprised of at least one or more of active alumina or active silica and mounting on said active film layer a metal mask having specified pattern holes, the step of mounting on said metal mask a transfer sheet having an ink layer containing a heat migrating dye, or an ink layer containing a dye capable of sumblimation and/or a hot-melt dye capable of being vaporized, the step of migrating said dye in said ink layer in a vapor state to said active film layer by heating for dyeing said film layer, and the step of removing said transfer sheet and said metal mask, repeating said steps sequentially according to the number of colors required, thereby forming sequentially on said active film layer patterns corresponding to the pattern holes in said metal mask, and finally forming an overcoat layer for closing fine holes in said active film layer at the top thereof, said heating being carried out in an atmosphere of reduced pressure.

The high-property, high-precision color filter in accordance with the invention comprises a transparent substrate, an active film layer formed on said substrate and comprised of at least one or more of active alumina or active silica, fine patterns (for example, dot, stripe, and other patterns) formed on same plane on said active film layer by a dye of any desired color being taken up into fine holes in said active film layer, and an overcoat layer provided on said active film layer and having no affinity to said dye.

DETAILED DESCRIPTION OF THE INVENTION

Figure 1:
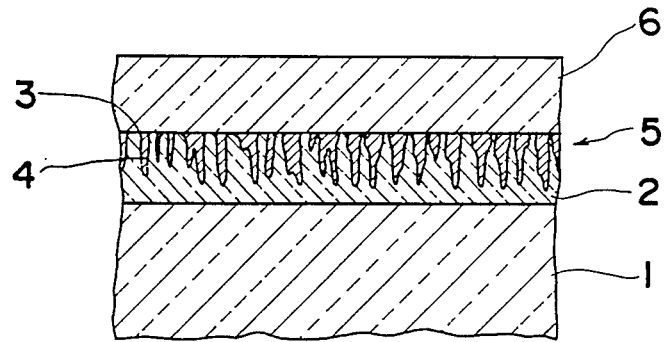
FIG. 1 is a schematic sectional view showing a color filter in accordance with the invention.

FIG. 1 shows a color filter representing one embodiment of the invention. The color filter has a transparent substrate 1, an active film layer 2 formed thereon, a pattern 5 formed by a dye 4 being taken up into a multiplicity of fine holes 3 in the active film layer 2, and an overcoat layer 6 provided over the active film layer 2.

The individual components of the embodiment will be described in detail in conjunction with a sequential explanation of the method of manufacturing the color filter according to the invention.

An active film layer 2 comprised of at least one or more of active alumina or active silica is first formed on a transparent substrate 1. For the transparent substrate 1 in the invention, any material used normally as such in liquid crystal display devices may be employed which is usually any commercially available soda glass, preferably a borosilicate glass having good properties.

To form said active film layer 2, a colloidal alumina or a colloidal silica, or a mixture thereof, is coated on the surface of the transparent substrate by the spinner or barcoat method, or the spray method, so that the thickness of the coat after drying to the touch (10~60 min at 40°~80° C.) is of the order of 2~10 μm, and after the coat is dried, it may be calcined at 350°~850° C. for 10~180 min. The active film layer 2 thus obtained is transparent and has a multiplicity of fine holes 3, ..., 3 formed therein, which serves as a dye site layer. When factors such as its transparency, surface hardness, and dye sorptivity are considered, the active film layer 2 should have a thickness of 0.5~10 μm, preferably 1.5~5 μm. The reason is that as the thickness of the active film layer 2 becomes greater, the layer tends to become milky and opaque, and conversely if the layer 2 is excessively thin, its dye sorptivity tends to decrease, so that the desired dye uptake cannot be obtained. Further, it is desirable that the active film layer 2 should be formed of an aqueous dispersion of a colloidal alumina having an electric conductance of 3.70 $m\omega^{-1}cm^{-1}$ or more. The active film layer 2 has a multiplicity of fine holes 3, ..., 3 formed therein and is colored by a dye 4 being taken up into the fine holes 3 at a subsequent stage.

Next, a metal mask having a specified pattern of holes is mounted on the transparent substrate 1 on which the active film layer 2 has been formed.

For the metal mask in the invention, any metallic material which can be worked for provision of specified pattern holes may be used. The metal mask should have a thickness of 0.005~0.5 mm, preferably about 0.007~0.05 mm. The specified pattern is formed by electroforming, chemical etching, electrical discharge machining, laser beam machining, or the like. The pattern may be in the form of dot, stripe, or any other pattern. If the object product is a color filter for a liquid crystal display device of the dot matrix type, the color filter must have a exceedingly high degree of fine dot pattern accuracy.

Then, a transfer sheet is mounted on top of the metal mask laid on the substrate.

The transfer sheet used in invention comprises, as its minimum necessary components, a base sheet formed of a macromolecular-type film or paper material or the like having good heat resistance, and an ink layer containing a dye and a binder. In this connection, the dye 4 is a heat migrating dye, or in other words, it consists of a dye capable of sublimation and/or a hot-melt dye capable of being vaporized. Among dyes of such type are disperse dyes, oil-soluble dyes having no metal content, cationic dyes, and so on. More concretely, dyes of "Miketon Polyester" series (produced by Mitsui Toatsu Chemicals, Inc.), "Kayaset" series (produced by Nippon Kayaku Co., Ltd.), "Oilcolor" series (produced by Orient Kagaku Kogyo K.K.), "Oleosol" series (produced by Sumitomo Chemical Co., Ltd.), "Diaresin" series (produced by Mitsubishi Chemical Industries, Ltd.), and so on. It is noted that colorants for synthetic resins are in the same category as oil-soluble dyes and may be used for the above purpose.

Next, heating is effected for causing said dye 4 to be taken up onto the active film layer 2. For this purpose, an ink containing the dye 4 is used and the heating is carried out at such temperature as will allow the dye 4 to thermally migrate into the fine holes 3. The heating may be effected, for example, at 100~250° C. for several to six hundred seconds, though the heating conditions may vary according to the kind of dye used.

One of the features of the present invention is that aforesaid heating is carried out in an atmosphere of reduced pressure. Specific conditions for this purpose vary according to the kind of dye used, the thickness of the metal mark, and the like. When the pressure is reduced, the temperature for initiation of dye vaporization will be lowered, but it is difficult to find any regularity in this connection. Accordingly, it is necessary to determine particular conditions for pressure reduction according to the type of each individual dye. For example, in the case where a metal mask having a thickness of 0.05 mm and a dye which initiates vaporization at 250° C. are used, dyeing cannot be effected even by 1 minute heating at 180° C. under normal pressure, but if the pressure in the atmosphere is reduced to 1 torr, a fine dyed pattern can be obtained by heating at same temperature for same period of time.

The above described step of dyeing is repeated for three colors, red, green, and blue, whereby patterns corresponding in size to the pattern holes in the metal mask and arranged on the same plane and in color order of red, green, and blue can be obtained. In above described stage of dyeing, metal masks prepared for three colors, red, green, and blue, may be used by replacing one with another as required, or if the individual patterns to be formed are identical, one metal mask may be used by sliding it each time. The patterns in three colors, red, green, and blue, are arranged with good positional accuracy. Their respective maximum ranges of transmission wavelengths are 570~700 nm for red, 480~580 nm for green, and 400~480 nm for blue. Each individual pattern has good transmittance and one side dimension thereof is as fine as several tens to several hundreds of μm.

The step of dyeing has now been completed, and then the transfer sheet and the metal mask are removed. Subsequently, an overcoat layer 6 for closing the fine holes 3, . . . , 3 in the active film layer 2 is formed on the film layer. It is essential that this overcoat layer 6 has no affinity to the dye 4, and for this purpose, rigid resins having good transparency, such as acrylic resin, melamine resin, epoxy resin, polyimide resin, urea resin, silcone resin, and so on are useful. The overcoat layer 6 is obtained by coating such resin on the fine holes in the active film layer 2, then heating the resin coat at such temperatures as will allow the resin to become hardened. Alternatively, the overcoat layer 6 may be obtained by coating of an inorganic material having no affinity to the dye 4, such as sodium silicate or lithium silicate, followed by heating, or spatter spraying of a transparent inorganic material, such as silicon dioxide. The provision of this overcoat layer 6 is intended to prevent the revaporization of dye molecules caught into the fine holes in the active film layer 2, to prevent any possible staining by unnecessary matter, and to improve the surface smoothness. If the overcoat layer 6 has some affinity to the dye 4, it is likely that when the color filter is subjected to heat treatment at a later stage (for example, at the stage of vacuum deposition or spatter spraying for the transparent conductive layer, or at the stage of setting up a liquid crystal color TV set), the dye 4 loaded on the active film layer 2 will migrate to the overcoat layer 6 and the bleeding of the dye 4 is caused, it being thus impossible to obtain any sharp dot pattern, with the result of considerable deterioration in quality. Therefore, the provision of the overcoat layer 6 having no affinity to the dye 4 permits the color filter to well withstand such heat treatment. Melamine resins are particularly preferred for the provision of good heat resistance, transparency, weathering properties, chemical resistance, and surface hardness.

In the case where the color filter in accordance with the invention is covered with a transparent conductive layer at a subsequent stage, the overcoat layer 6 should be formed of a material capable of forming a good bond with the material of which the transparent conductive layer is composed. In this way an improved bond between the color filter and the transparent conductive layer can be assured, the color filter being advantageous. The transparent conductive layer is formed in such a manner that the part or whole surface of the overcoat layer 6 is covered.

Figure 2:
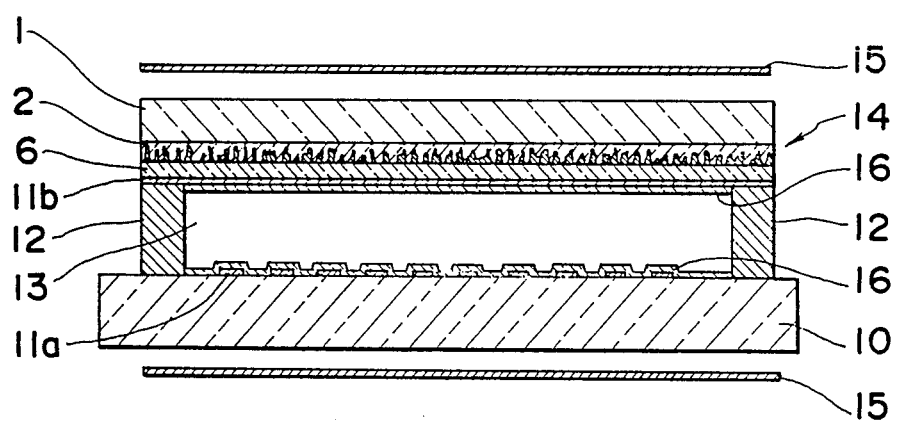
FIG. 2 is a schematic section showing by way of example a liquid crystal display device in which the color filter according to the invention is employed. It is noted that in order to facilitate clear understanding of the illustration therein, each figure is depicted exaggratedly without regard to the relative dimensions of the component elements.

FIG. 2 schematically shows an instance in which the color filter according to the invention is employed in a liquid crystal display device. A transparent conductive layer 11a is laid on the surface of a transparent substrate 10, and the color filter 14 of the invention is placed opposite to said surface across a space defined by spacers 12. A transparent conductive layer 11b is provided on the color filter 14, and liquid crystal 13 is enclosed in said space. Deflection plates 15 are disposed on the respective outer surfaces of the substrate 10 and color filter 14. Orientation membranes 16 are placed on the respective tops of the transparent conductive layers 11a, 11b.

The following example is given to further illustrate the invention, and a comparative example is also given for comparison with the example.

(EXAMPLE)

On one side of an alkali cleaned transparent glass plate was spray-coated Alumina sol-200 (produced by Nissan Chemical Industries, Ltd.), and the coat was dried at 70° C. for 5 min. Then, the coat was calcined at 550° C. for 45 min. Thus, an active film layer having a thickness of about 2 μm was produced on the glass plate.

Meanwhile, mixtures of the following ingredients were mixed and kneaded by means of a three-roll mill and three kinds of screen ink were obtained.

| (I) Red ink | |
|---|---|
| Ethyl cellulose N-7 (produced by Hercules Incorporated) | 15 parts (by weight) |
| Ethyl cellulose N-22 (produced by Hercules Incorporated) | 5 parts |
| Waxonline Red YP (produced by Imperial Chemical Industries, Ltd.) | 8 parts |
| Butyl Cellosolve | 22 parts |
| Butyl Cellosolve Acetate | 20 parts |
| Solvesso 150 | 30 parts |
| (II) Green ink | |
| Ethyl cellulose N-7 (produced by Hercules Incorporated) | 15 parts (by weight) |
| Ethyl cellulose N-22 (produced by Hercules Incorporated) | 5 parts |
| Oleosol Fast Yellow 5 G (produced by Taoka Chemical Co., Ltd.) | 6 parts |
| Miketon Polyester Green G (produced by Mitsui Toatsu Chemicals, Inc.) | 4 parts |
| Butyl Cellosolve | 20 parts |
| Butyl Cellosolve Acetate | 20 parts |
| Solvesso 150 | 30 parts |

-continued

| (III) Blue Ink | |
|---|---|
| Ethyl cellulose N-7 | 15 parts |
| (produced by Hercules Incorporated) | (by weight) |
| Ethyl cellulose N-22 | 5 parts |
| (produced ny Hercules Incorporated) | |
| Kayalon Polyester Blue TS | 10 parts |
| (produced by Nippon Kayaku Co., Ltd.) | |
| Butyl Cellosolve | 20 parts |
| Butyl Cellosolve Acetate | 20 parts |
| Solvesso 150 | 30 parts |

Aforesaid screen inks were used to effect screen printing on individual sheets and thus transfer sheets in red, green, and blue were obtained.

Meanwhile, three 0.03 mm thick stainless steel metal masks each having a specified dot pattern were prepared.

Next, the glass plate prepared in manner as above was preheated to 180° C. The metal mask for blue ink was mounted in position on the glass plate, and the transfer sheet printed in blue ink was placed thereon so that the printed surface of the transfer sheet is in contact with the metal mask. The composite was heated and pressed with a silicone rubber piece having JIS hardness 50 and heated to 180° C., under condition of 1 torr. Then, the transfer sheet and the metal mask were removed, and a blue dot pattern corresponding to the dot pattern of the metal mask was printed on the glass plate.

Then, on the glass plate, on which the blue dot pattern was formed at the preceding stage, and in a specified position other than that for said blue dot pattern, was placed the matal mask for green ink, on top of which was placed the transfer sheet printed with the green ink. In a manner identical to that done earlier, heating and pressing were carried out under the condition of 50 torr and at 180° C. for 40 sec.

Next, with the metal mask for red ink and the transfer sheet printed with red ink, the step of heating and pressing was carried out in same manner as above and under the condition of 100 torr at 180° C. for 30 sec. Thus, a dot pattern in red was transferred.

An overcoat agent composed of the following ingredients was coated on the glass plate onto which the three primary-color dot patterns had been transferred. The overcoat was heat treated at 180° C. for 15 min.

| Melamine resin | 5 parts |
|---|---|
| Acrylic resin | 10 parts |
| Water | 85 parts |

Thus, a color filter having three primary color dot patterns formed thereon was obtained.

(COMPARATIVE EXAMPLE)

For the purpose of comparison, processing was carried out under same conditions as in the foregoing example, except that heating was effected under normal pressure. The result was that no dyeing took effect with all of the three colors. Then, experiments were conducted under more severe heating conditions. Dyeing was possible under heating at 250° C. for 120 sec for blue color, at 250° C. for 90 sec for green color, and at 250° C. for 60 sec for red color. A color filter having three primary color dot patterns formed thereon was thus obtained.

The color filters obtained in the example and comparative example are compared in respect of properties and performance accuracy in Table 1.

TABLE 1

| | Spectral transmittance blue (450 nm) | Spectral transmittance green (550 nm) | Spectral transmittance red (610 nm) |
|---|---|---|---|
| Example | 70% | 50% | 80% |
| Comp. Example | 60% | 45% | 68% |

As is apparent from Table 1, the color filter obtained in the example has excellent transparency. The color filter in the comparative example was obtained under higher temperature conditions; and from this fact it is assumed that impurities, such as gases, arising from the ink layer and transfer sheet during transfer dyeing were adsorbed onto the active film layer, whereby the transparency of the color filter was adversely affected. Further, the active ingredient of one dyed dot pattern in the color characteristics of the color filter in the example of the invention was 4/5 times as much as that in the color filter of the comparative example. In the case of a color filter having an effective area of 60×60 mm$^2$, the dimensional distortion error of a square was 7/6 times.

The color filter according to the invention has the following advantages because of the above described constructional features. That is, the provision of an active film layer of an inorganic material and an overcoat layer having no affinity to the dye assures better performance in heat resistance, water resistance, and resistance to chemicals and solvents, as compared with the conventional type using an organic gelatin layer. The used dyes have excellent various properties and spectral properties. The fact that three primary color patterns are formed on same plane assures smoothness, an essential requirement for formation of a transparent conductive layer.

According to the color-filter manufacturing method of the invention, heating is carried out in an atmosphere of reduced pressure. This provides the following advantages. That is, since no effect of air resistance of the like is present, dye molecules can be well dispersed. Therefore, less energy is required in processing, and less distortion due to the expansion of the metal mask is involved. This assures higher dimensional reproducibility and facilitates the production of a high-precision color filter having a uniform and irregularity-free dye pattern. The temperature of dye molecule vaporization is lowered and this permits greater range of dye selection and use of dyes having higher dyeability and thermal stability (for example, hot-temperature dyes capable of being vaporized having excellent properties and which melt at more than 200° C. and vaporize at more than 250° C. can be used at temperatures below 180° C.). Further, impurities which are likely to be adsorbed onto the active film layer are vaporized in an atmosphere of reduced pressure, and this contributes to improved transparency of the active film layer. Therefore, it is possible to obtain a high-property color filter. Since the thickness of the metal mask is less likely to have unfavorable effect, a metal mask having greater thickness, with the resulting advantage of increased durability.

What is claimed is:

1. A method of manufacturing a high-property, high-precision color filter, which comprises:

(a) a step of forming on a transparent substrate an active film layer comprised of at least one or more of active alumina or active silica and mounting on said active film layer a metal mask having specified pattern holes;

(b) a step of mounting on said metal mask a transfer sheet having an ink layer containing a heat migrating dye;

(c) step of migrating said dye in said ink layer in vapor state to said active film layer by heating for dyeing said film layer;

(d) a step of removing said transfer sheet and said metal mask;

(e) repeating said steps (a) through (d) sequentially according to the number of colors required, thereby forming sequentially on said active film layer patterns corresponding to the pattern holes in said metal mask, and (f) a step of forming an overcoat layer for closing fine holes in said active film layer at the top thereof, said heating being carried out in an atmosphere of reduced pressure.

2. A method of manufacturing a high-property, high-precision color filter as set forth in claim 1, wherein said heat migrating dye is a dye capable of sublimation.

3. A method of manufacturing a high-property, high-precision color filter as set forth in claim 1, wherein said heat migrating dye is a hot-melt dye capable of being vaporized.

4. A method of manufacturing a high-property, high-precision color filter as set forth in claim 1, wherein said heat migrating dye consists of a dye capaable of sublimation and a hot-melt dye capable of being vaporized.

5. A high-property, high-precision color filter comprising a transparent substrate, an active film layer formed on said transparent substrate and comprised of at least one or more of active alumina or active silica, fine patterns formed on said active film layer by a dye of any desired color being taken up into fine holes in said active film layer, and an overcoat layer provided on said active film layer and having no affinity to said dye.

6. A high-property, high-precision color filter as set forth in claim 5, wherein said active film layer is an active alumina layer and wherein said active alumina layer is formed of an alumina sol having an electric conductance of more than 3.70 $m\Omega^{-1}cm^{-1}$, said layer, after being calcined, having a thickness of $1\mu m \sim 5\mu m$.

7. A high-property, high-precision color filter as set forth in claim 5, wherein said dye is a heat migrating dye.

8. A high-property, high-precision color filter as set forth in claim 7 wherein said heat migrating dye is a dye capable of sublimation.

9. A high-property, high-precision color filter as set forth in claim 7, wherein said heat migrating dye is a hot-melt dye capable of being vaporized.

10. A high-property, high-precision color filter as set forth in claim 7, wherein said heat-migrating dye consists of a dye capable of sublimation and a hot-melt dye capable of being vaporized.

11. A high-property, high-precision color filter as set forth in claim 5, wherein said pattern is a dot pattern.

12. A high-property, high-precision color filter as set forth in claim 5, wherein said pattern is a stripe pattern.

13. A high-property, high-precision color filter as set forth in claim 11, wherein said dot pattern consists of three colors, red, green, and blue, and wherein said dot pattern has a maximum transmittance wavelength within the wavelength ranges of $570 \sim 700$ nm for red, $480 \sim 580$ nm for green, and $400 \sim 480$ nm for blue, and wherein said dot pattern is dimensionally as fine as several tens to several hundreds of $\mu m$.

14. A high-property, high-precision color filter as set forth in claim 5, wherein said overcoat layer is formed of an organic or inorganic material capable of forming a good bond with a material constituting a transparent conductive layer.

15. A high-property, high-precision color filter as set forth in claim 14, wherein that portion of said overcoat layer which corresponds to the entire surface of said pattern is covered with the transparent conductive layer.

* * * * *

UNITED STATES PATENT AND TRADEMARK OFFICE
CERTIFICATE OF CORRECTION

PATENT NO. : 4,776,671
DATED : October 11, 1988
INVENTOR(S) : Takao SUMI et al.

It is certified that error appears in the above-identified patent and that said Letters Patent is hereby corrected as shown below:

On title page, item [75] change

"Tenri Hiratani" to --Tenri Isoda--.

Signed and Sealed this

Twelfth Day of April, 1994

Attest:

BRUCE LEHMAN

*Commissioner of Patents and Trademarks*

*Attesting Officer*